(12) United States Patent
Manoukis et al.

(10) Patent No.: US 9,384,604 B1
(45) Date of Patent: Jul. 5, 2016

(54) TRANSFER DONGLE FOR STORED VEHICLE INFORMATION

(71) Applicant: RB Distribution, Inc., Colmar, PA (US)

(72) Inventors: Dimitri Manoukis, Telford, PA (US); Joseph T. Hubicki, East Norriton, PA (US); Robin Nyce, Colmar, PA (US); Christopher Todd Blalock, Fountainville, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 14/928,854

(22) Filed: Oct. 30, 2015

Related U.S. Application Data

(60) Provisional application No. 62/222,982, filed on Sep. 24, 2015.

(51) Int. Cl.
*G07C 5/00* (2006.01)
*G07C 5/08* (2006.01)
*G07C 5/02* (2006.01)
*H04W 4/00* (2009.01)
*H04L 29/08* (2006.01)
*H04W 84/12* (2009.01)

(52) U.S. Cl.
CPC ...... *G07C 5/085* (2013.01); *G07C 5/02* (2013.01); *H04L 67/12* (2013.01); *H04W 4/008* (2013.01); *H04W 84/12* (2013.01)

(58) Field of Classification Search
CPC .......... G07C 5/006; G07C 5/008; G07C 5/08; G07C 5/0841–5/0858; G07C 5/0875; G07C 5/0883; G07C 2205/02; H04L 67/12; B60W 2050/0062–2050/0067; B60W 2050/0075–2050/0089
See application file for complete search history.

(56) References Cited

U.S. PATENT DOCUMENTS

| | | | |
|---|---|---|---|
| 5,864,297 | A | 1/1999 | Sollestre et al. |
| 6,941,203 | B2 | 9/2005 | Chen |
| 7,315,238 | B2 | 1/2008 | Chambers et al. |
| 8,466,774 | B2 | 6/2013 | Lopez et al. |
| 8,626,331 | B2 | 1/2014 | Marsh et al. |
| 8,634,951 | B2 | 1/2014 | Freeman |
| 8,682,468 | B2 | 3/2014 | Marsh et al. |
| 8,841,987 | B1 | 9/2014 | Stanfield et al. |
| 8,979,446 | B2 | 3/2015 | Freeman |
| 2004/0122542 | A1 | 6/2004 | Yang |
| 2005/0177284 | A1 | 8/2005 | Kugumiya et al. |
| 2005/0248436 | A1 | 11/2005 | Hohmann et al. |

(Continued)

FOREIGN PATENT DOCUMENTS

WO    2009010919 A3    1/2009

OTHER PUBLICATIONS

Garrido, "Ford PCM Programming: The Other Procedures," May 1, 2011, Search Autoparts, http://www.searchautoparts.com/motorage/technicians/scope-scan-service-repair/ford-pcm-programming-other-procedures.*

(Continued)

*Primary Examiner* — Spencer Patton
(74) *Attorney, Agent, or Firm* — Volpe and Koenig, P.C.

(57) ABSTRACT

A dongle for transferring electronic information from and to a vehicle module. The dongle collects and stores data specific to a module or component in the original format and enables that original data to be written or uploaded to a repaired or new module or component. Preferably, the dongle is programmed for limited use and will disable itself after a successful data transfer to the module or component.

12 Claims, 2 Drawing Sheets

(56) References Cited

U.S. PATENT DOCUMENTS

| | | |
|---|---|---|
| 2006/0208069 A1 | 9/2006 | Gilbert et al. |
| 2007/0001805 A1 | 1/2007 | Utter et al. |
| 2007/0296559 A1 | 12/2007 | Fehr |
| 2008/0122594 A1 | 5/2008 | Brecht et al. |
| 2008/0150685 A1 | 6/2008 | Desai et al. |
| 2009/0160607 A1 | 6/2009 | Edwards et al. |
| 2009/0276115 A1 | 11/2009 | Chen |
| 2009/0278656 A1 | 11/2009 | Lopez et al. |
| 2010/0205450 A1 | 8/2010 | Sarnacke et al. |
| 2010/0293081 A1* | 11/2010 | Liu ................ G06Q 30/04 705/34 |
| 2011/0035461 A1* | 2/2011 | Sodergren .......... G05B 19/0423 709/213 |
| 2011/0288954 A1 | 11/2011 | Bertosa et al. |
| 2012/0330498 A1 | 12/2012 | Nagara et al. |
| 2013/0141212 A1 | 6/2013 | Pickering |
| 2013/0204485 A1* | 8/2013 | Chen ................ G06F 17/00 701/29.6 |
| 2013/0282229 A1* | 10/2013 | Wittliff, III ........ G07C 5/0808 701/33.2 |
| 2014/0104771 A1 | 4/2014 | Colan |

OTHER PUBLICATIONS

Cardone Industries, "How to Reporgram a Ford PCM," Jun. 26, 2015, https://www.youtube.com/watch?v=Y_3hQl0VivQ.*

Advanced Diagnostics Usa. (2013, Sep. 06). World Leader in Transponder Key Programming-mvptcodesupport. Retrieved from https://web.archive.org/web/20130906051317/http://www.mvptcodesupport.com/, pp. 1-2.

Product literature, Keyless Remote Program, 2013.

* cited by examiner

US 9,384,604 B1

TRANSFER DONGLE FOR STORED VEHICLE INFORMATION

CROSS REFERENCE TO RELATED APPLICATION(S)

This application claims the benefit of U.S. Application Ser. No. 62/222,982, filed on Sep. 24, 2015, which is incorporated by reference as if fully set forth.

BACKGROUND

Modern vehicles use an increasing number of components that require electronic controls or programmed modules. In many cases, the electronics or modules are enclosed within components, like transmissions. Because of the increase in electronic controls or operating parameters, there is an associated need to program or reprogram a new component or repaired component. Because the repaired vehicle is generally an older vehicle, it is also desirable to maintain the original program associated the component. There is a need for a vehicle transfer dongle that can communicate with the vehicle electronics to identify the desired component and its program, down load the identified program to a memory, and write the identified program to the new or repaired component. This process maintains the original electronic controls or operating parameters associated with the new or repaired component.

SUMMARY

The disclosed transfer dongle connects directly to a vehicle's data link connector, directly, such as by OBD-II, or wireless, such as by Bluetooth or Wi-Fi, to locate the component's associated program and reads that program to a storage or memory location in the dongle. When the repair is completed to the point where the stored program is needed, the dongle reconnects with the vehicle electronics and writes the stored program from the memory back into the component. Preferably, the dongle is configured for use with a specific component, for example a transmission, and a specific vehicle, for example an SUV. This simplifies the dongle and avoids the potential for reading the wrong program to the dongle's memory, or if the dongle were to communicate, the possibility of writing the program to the wrong vehicle.

Preferably, the transfer dongle is configured for a specifically identified vehicle and is a limited use OBD-II dongle. More preferably, the transfer dongle is configured for a specific component or module of the identified vehicle. The dongle, when connected directly to a vehicle OBD-II connector (Data Link Connector) in a vehicle network port, initiates a process of communicating with a specified vehicle module or component, interrogating that module or component, and reading the control information associated with it into a memory. The information is store temporarily in the memory until it is ultimately written back into a repaired or replacement module or component. The transfer dongle communicates with the vehicle through the available media and is suitable for use with vehicles having Bluetooth or Wi-Fi connectivity.

The transfer dongle is a convenient alternative to data transfer procedures requiring the use of expensive scan tools or computers.

BRIEF DESCRIPTION OF THE DRAWINGS

A more detailed understanding may be had from the following description, given by way of example in conjunction with the accompanying drawing.

DETAILED DESCRIPTION

The following description of the invention is made with reference to above identified Figures.

The dongle 10 has housing 12 that contains the electronics for accomplishing the transfer and a connector 14 for interfacing with the vehicle electronics. The housing 12 and connector 14 are known elements in the art; however, the electronics elements are specific to the present invention. As will be described herein, many of the electronic components are available from industry suppliers and it is their arrangement and the programming of the microcontroller that enable the data transfer.

Figure 1:
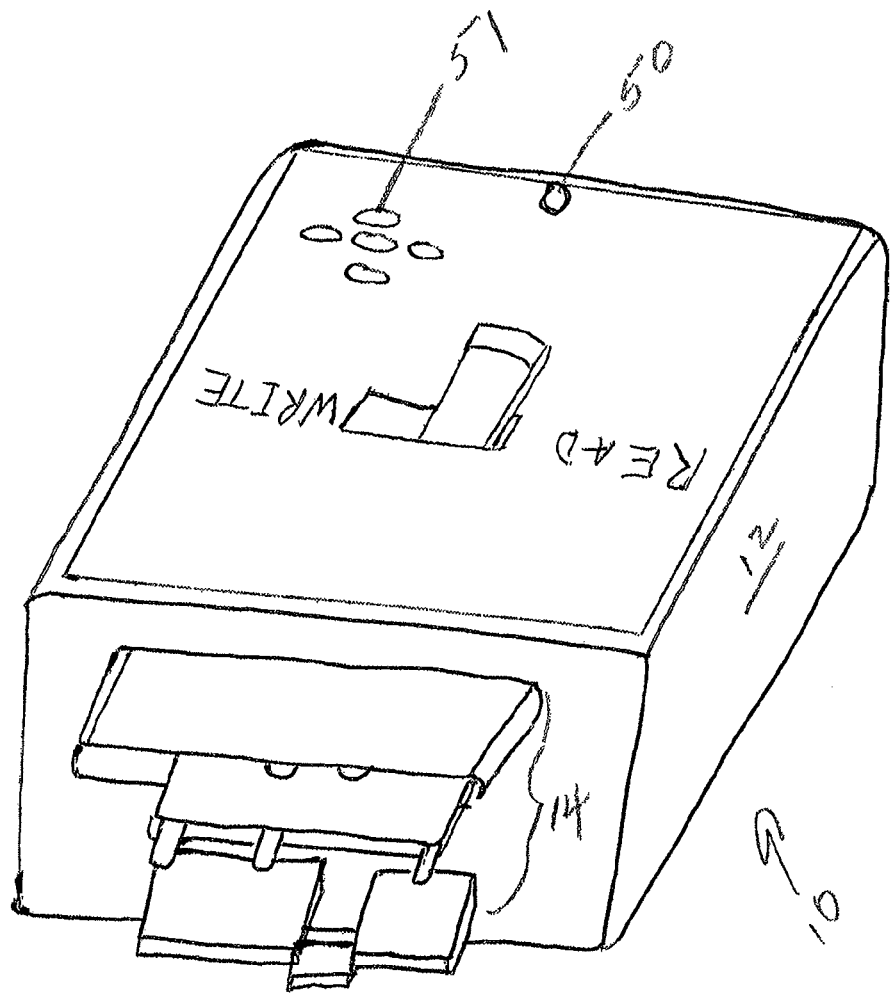
FIG. 1 is an exemplary dongle housing configuration that is usable to contain the dongle elements and interface to the vehicle's on board electronics; and, FIG. 2 is a block diagram illustrating the elements of an OBD-II compatible transfer dongle.
Figure 2:
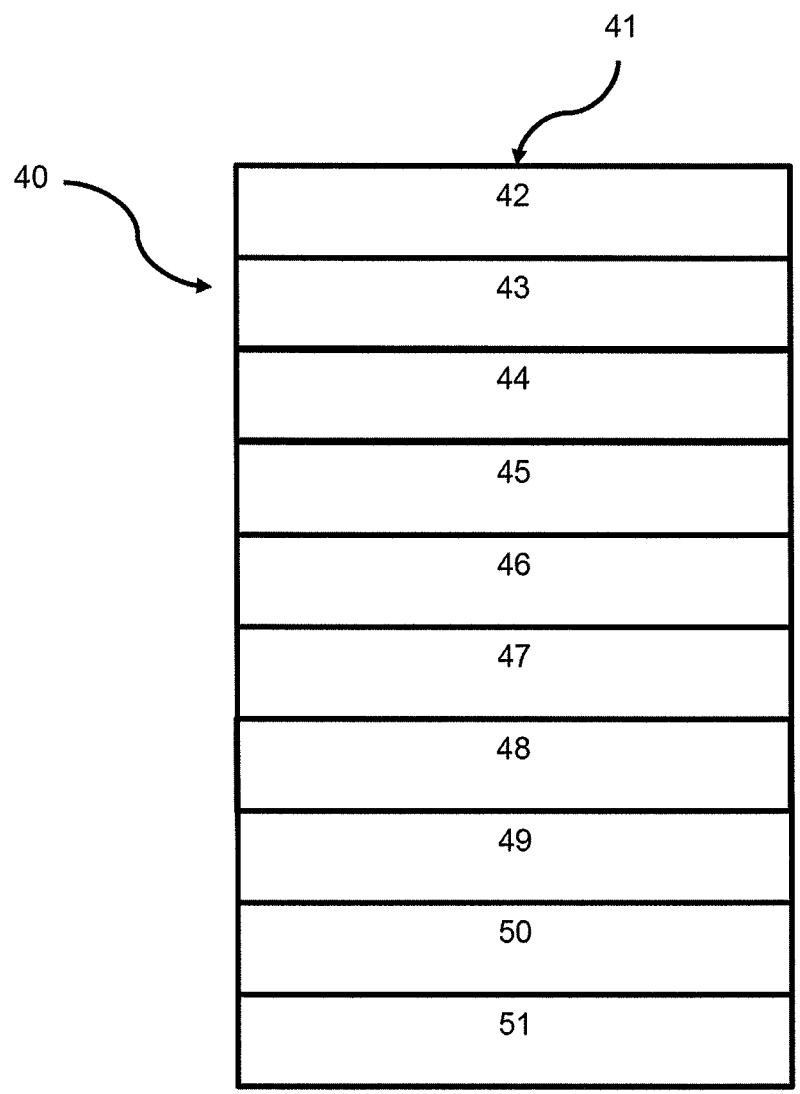

FIG. 2 illustrates the electronic components within the dongle 10. The dongle components comprising the electronics are assembled as printed circuits which may be on one or multiple boards as generally illustrated at 40. It will be understood by those skilled in the art that the elements shown at 40 are not the only elements capable of providing the necessary function and is various electronic elements do not necessarily have to have arrangement of circuits as indicated at 41. The connector 42 is of a known configuration for standard vehicle communications with vehicle onboard diagnostics (OBD)-II systems and includes ISO15765-4 CAN (Both High Speed and Single Wire CAN), ISO 9141-2 (K-Line), KW2000 and J1850 (Both VPW and PWM variations). The dongle 10 has power supply 43, such as AZ1117CH-3.3TRG1 available from Diodes Incorporated. Element 44 is microcontroller, such as an 8-bit microcontroller STM8S208CBT6 available from STMicroelectronics, for programming the dongle 10 according to the specific application, whether it is vehicle or component specific. Element 45 is a CAN transceiver, such as TJA1050T/VM,118 available from Philips Semiconductors, for connecting to the specified vehicle or module. Element 46 is a switch for selected between the read or write modes of the dongle 10. Element 47 is the reader, such as SN74LVC2T45 available from TI Transceiver, for transferring the selected data or information to a memory. Element 48 is a memory, such as flash memory W25Q64FVSSIG available from Windbond Electronics, for containing the data read from the module or component. In Bluetooth or Wi-Fi circumstances, the data may be stored on a remote memory, such as a cell phone, on a USB, or on the cloud. Element 49 is a writer, such as SN74LVC4245A available from TI Transceiver, for transferring the selected data or information from memory to the specific module or component. Element 50 is a visual indicator, such as an LED, for alerting an operator and element 51 is an audio indicator, such as a speaker or beeper, for altering an operator that a given operation was successfully connected or completed.

As noted earlier, the data transfer dongle 10 preferably is specific to a vehicle and a vehicle module or component. The transfer dongle 10 is configured for specific vehicle application and programmed, using known parameters, so that it will initiate an automatic detection of the vehicle's communication interface format. For a given vehicle application, a maximum number of communication systems may be enabled in the transfer dongle to transmit and receive data in accordance with standard communication protocols.

When the vehicle's onboard computer recognizes the connection with the data transfer dongle, the vehicle's onboard computer identifies the proper module(s) to be coupled to the dongle. This connection may be indicated through the visual or audio indicator. Having established the communication path, the specifically configured dongle interrogates the target module and reads the relevant data to the dongle's flash memory. In many applications, the information is secured and some form of security handshake is needed to gather the information. Security can serve the dual purpose of general protection and the more specific purpose of assuring that the communication is directed at the correct component. After the information is captured in the transfer dongle, it is possible to repair or replace, as needed, the specific module or component. After the repair or replacement is completed, the transfer dongle is reconnected to the vehicle and the switch 30 on dongle 10 is moved from the read position to the write position and the data from the flash memory is transferred to the selected module in the same format and condition as it was originally read from the module.

The above description discussed the circumstance where the dongle is communicating through the vehicle; however, it will be recognized by those of skill in the art that some modules or components have embedded information which may be similarly extracted and installed using such a dongle.

In-vehicle networking is a known method for transferring data between electronic modules via a serial data BUS. The Society Automotive Engineers (SAE) standards include the following three categories of in-vehicle network communications: Class A, Class B, and Class C. Class A may be low speed (less than 10 Kb/s) and used for convenience features, such as entertainment. Class B may be medium speed (between 10 and 125 Kb/s) and used for general information transfer, such as emission data and instrumentation. Class C may be high speed (greater than 125 Kb/s) and may be used for real-time control, such as traction control, brake by wire, and the like.

All cars and light trucks built for sale in the United States after 1996 are required to be OBD-II compliant. There are five OBD-II protocol types in use: J1850 PWM, J1850 VPW, ISO 9141-2, ISO 14230 KWP2000, and ISO 15765 CAN. Since each protocol differs electrically and by communication format, the transfer dongle is configured to be compatible with the vehicle's specific protocol in order to communicate with the vehicle's network.

As noted previously, the dongle is preferable a single use dongle. However, the single use aspect of the invention does not mean that an operator will have only one attempt to connect and read data or only one attempt to connect and write data. It is contemplated that the dongle will provide three to five attempts to read and/or write data. In operation, a successful connection to the vehicle may trigger a visual indicator, such as an LED. Successful connection to the component may trigger an audio indicator, such as one or more beeps, or a visual indicator, such as a flashing LED. The visual and audio indicators can be repeatedly alternated or modulated in accordance with the number of successful operations expected. If an operator exceeds the permitted number or attempts at any particular operation, the dongle is preferably programmed to deactivate. Once an operator has received an indication that the data was successfully written to the module or component, the dongle is programmed to provide an indication of that success and to deactivate or disable itself so that it is not reusable.

What is claimed is:

1. A dongle for reprogramming a vehicle component with pre-existing electronic data, the dongle comprising:
   an interface that connects with a vehicle's on-board electronics;
   a diagnostic circuit that interrogates a vehicle's on-board electronics and determines a communication protocol for pre-existing data stored in a vehicle's on-board electronics;
   a circuit that collects pre-existing data associated with a specific vehicle component in the data's original format;
   a memory that receives and stores the collected pre-existing data in the data's original format;
   a circuit that transfers the stored pre-existing data from the memory into a specific vehicle component in the data's original format; and
   a controller that deactivates the dongle in response to a positive indictor signal that the pre-existing data stored in the memory transferred from the memory into a specific vehicle component.

2. The dongle of claim 1 further comprising an indicator, which signals that the diagnostic circuit successfully determined a communication protocol for pre-existing data stored in the vehicle's on-board electronics.

3. The dongle of claim 1 further comprising an indicator, which signals that the memory stored the pre-existing data.

4. The dongle of claim 1 further comprising an indicator, which signals that the pre-existing data stored in the memory transferred from the memory into a specific vehicle component.

5. The dongle of claim 1, wherein the dongle connects through a communication protocol selected from a group comprised of: J1850 PWM; J1850 VPW; ISO 9141-2; ISO 14230; KWP2000; and, ISO 15765 CAN.

6. A dongle for reprogramming a vehicle component with pre-existing electronic data, the dongle comprising:
   an interface that connects with a vehicle's on-board electronics;
   a diagnostic circuit that interrogates a vehicle's on-board electronics and determines a communication protocol for pre-existing data stored in a vehicle's on-board electronics;
   a circuit that collects pre-existing data associated with a specific vehicle component in the data's original format;
   a memory that receives and stores the collected pre-existing data in the data's original format;
   a circuit that transfers the stored pre-existing data from the memory into a specific vehicle component in the data's original format; and
   a controller that limits attempts to transfer the stored pre-existing data from the memory into a specific vehicle component to a predetermined number and deactivates the dongle in response to a positive indictor signal that the pre-existing data stored in the memory transferred from the memory into a specific vehicle component.

7. The dongle of claim 6, wherein the dongle connects through a communication protocol selected from a group comprised of: J1850 PWM; J1850 VPW; ISO 9141-2; ISO 14230; KWP2000; and, ISO 15765 CAN.

8. A dongle for reprogramming a vehicle component with pre-existing electronic data, the dongle comprising:
   an interface that connects with a vehicle's on-board electronics;
   a diagnostic circuit that interrogates a vehicle's on-board electronics and determines a communication protocol for pre-existing data stored in a vehicle's on-board electronics;
   a circuit that collects pre-existing data associated with a specific vehicle component in the data's original format;
   a memory that receives and stores the collected pre-existing data in the data's original format;

a circuit that transfers the stored pre-existing data from the memory into a specific vehicle component in the data's original format; and a controller that limits attempts to transfer the stored pre-existing data from the memory into a specific vehicle component to a predetermined number of available attempts and deactivates the dongle in response to an indication that the predetermined number of attempts available were attempted.

9. The dongle of claim 8 wherein the controller deactivates the dongle in response to a positive indictor signal that the pre-existing data stored in the memory transferred from the memory into a specific vehicle component.

10. The dongle of claim 8, wherein the dongle connects through a communication protocol selected from a group comprised of: J1850 PWM; J1850 VPW; ISO 9141-2; ISO 14230; KWP2000; and, ISO 15765 CAN.

11. A dongle for reprogramming a vehicle component with pre-existing electronic data, the dongle comprising:

an interface that connects with a vehicle's on-board electronics;

a diagnostic circuit that interrogates a vehicle's on-board electronics and determines a communication protocol for pre-existing data stored in a vehicle's on-board electronics;

a circuit that collects pre-existing data associated with a specific vehicle component in the data's original format;

a memory that receives and stores the collected pre-existing data in the data's original format;

a circuit that transfers the stored pre-existing data from the memory into a specific vehicle component in the data's original format; and a security key that prevents the circuit for collecting pre-existing data from collecting data associated with any component other than the specific vehicle component.

12. The dongle of claim 11, wherein the dongle connects through a communication protocol selected from a group comprised of: J1850 PWM; J1850 VPW; ISO 9141-2; ISO 14230; KWP2000; and, ISO 15765 CAN.

\* \* \* \* \*